United States Patent Office 3,487,087
Patented Dec. 30, 1969

3,487,087
NITRATION OF IMIDAZOLES
Lewis H. Sarett, Princeton, Dale R. Hoff, Cranford, and David W. Henry, Plainfield, N.J., assignors to Merck & Co., Inc., Rahway, N.J., a corporation of New Jersey
No Drawing. Original application Mar. 10, 1964, Ser. No. 350,639, now Patent No. 3,399,211, dated Aug. 22, 1968. Divided and this application Feb. 2, 1968, Ser. No. 724,649
Int. Cl. C07d 49/36, 99/04; A01n 9/20
U.S. Cl. 260—309                                            3 Claims

ABSTRACT OF THE DISCLOSURE

The process of nitrating 2-aryl-substituted nitroimidazoles by reaction with nitronium salts to produce the corresponding 2-aryl-4(5)-nitroimidazole. The nitroimidazole thus obtained is useful as an intermediate in preparing 1-substituted-2-aryl-4(5)-nitroimidazoles having anti-protozoal activity.

This application is a division of Ser. No. 350,639, filed Mar. 10, 1964 and now Patent No. 3,399,211 issued Aug. 22, 1968.

This invention relates generally to new imidazoles and more particularly to new 2-aryl nitroimidazoles and to methods for their preparation. Still more specifically, it is concerned with 1-substituted-2-aryl-5-nitroimidazole, 1-substituted-2-aryl-4-nitroimidazoles, and structurally related isoindoles and dihydro isoquinolines, with the chemical synthesis of these new heterocyclic compounds, with compositions containing such compounds, and with the use of such compounds and compositions as parasiticides. More particularly, the invention is concerned with 1-substiuted-2-aryl-5-nitroimidazoles, 1-substituted-2-aryl-4-nitroimidazoles, and related isoindoles and dihydroisoquinolines and their use as antiprotozoals. The invention is further concerned with novel nitroimidazoles useful as intermediates in the preparation of the active parasiticides and with methods for their preparation.

Histomoniasis is a poultry disease due to the protozoan parasite *Histomonas meleagridis*. This disease, also known as turkey blackhead or enterohepatitis, is a serious economic problem in the turkey-raising industry. The infestation frequently spreads rapidly in turkey flocks and high mortality rates due to the disease are common. The compounds now commercially available for treating turkey blackhead are somewhat beneficial, but none have proven entirely satisfactory because they permit development of resistant strains of the infecting organism or lead to undesired side effects when ingested by the birds in quantities sufficient to treat the disease.

The protozoan disease trichomoniasis caused by *T. vaginalis* primarily infests the human vagina and is the etiological agent of a very troublesome and prevalent form of vaginal infestation known as *T. vaginalis* vaginitis. Drugs herefore available for treating this condition like those used for treating enterohepatitis have certain limitations and disadvantages.

One object of the present invention is to provide a new class of chemical compounds which have a high degree of antiprotozoal activity. Another object is to provide new 1-substituted-2-aryl - 5 - nitroimidazoles, 1-substituted-2-aryl-4-nitroimidazoles, and structurally related isoindoles and dihydroisoquinolines. A further object is to provide processes for the preparation of the novel compounds. Still another object is the provision of new nitroimidazoles which are intermediates in the synthesis of such compounds. A further object is provision of processes for the preparation of these intermediates. A still further object is provision of antitrichomonal and antihistomonal compositions containing the novel compounds of this invention as active ingredients thereof. Further objects will become clear from the following description of the invention.

According to this invention, it has now been found that certain 1-substituted-2-aryl-5-nitroimidazoles and 1-substituted-2-aryl-4-nitroimidazoles are highly effective parasiticides. Generally, the 1-substituted-2-aryl-5-nitroimidazoles are more effective parasiticides than the corresponding 1-substituted-2-aryl-4-nitroimidazoles, but both types of nitroimidazoles are particularly effective against the parasites causing histomoniasis and trichomoniasis. An important feature of the compounds of this invention is that the substituent attached to the 2-position on the imidazole moiety of the active compounds be an argyl group. The aryl substituent may be unsubstituted or substituted at one or more of the positions on the ring. Ortho, meta and parasubstitution and combinations thereof are contemplated by the present invention. Hereafter, when the term aryl is used in referring to a substituent on the 2-position of the imidazole moiety such term is intended to embrace substituted aryl radicals, i.e. those having attached to the aryl nucleus groups other than hydrogen.

The novel 2-aryl-nitroimidazoles of this invention may be represented by the structural formula

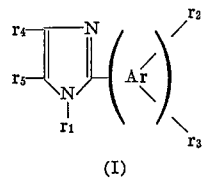

(I)

where Ar is aryl; $r_1$ is hydrogen, loweralkyl or $$-(CH_2)_nX$$

where $n$ has a value of 2–4 and X is halo, hydroxy or loweralkoxy; and $r_2$ is hydrogen, nitro, halo, carboxamido, sulfonamido, amino or lower alkoxy.

The symbol $r_3$ represents hydrogen, lower alkyl, carboxy, aryl, halo, hydroxy, amino, loweralkylamino, diloweralkylamino, nitro, sulfonamido, loweralkylsulfonamido, loweralkoxy, loweralkylthio, cyano, carboxamido, loweralkylcarboxamido, diloweralkylcarboxamido, formyl, loweralkanoyl, acylaminoloweralkyl, loweralkylaminoloweralkyl, diloweralkylaminoloweralkyl, N'-morpholinoloweralkyl, N'-piperidinoloweralkyl, N'-pyrrolidinoloweralkyl, hydroxyloweralkyl, loweralkoxyiminocarbonyl, amidino, loweralkylamidino, diloweralkylamidino, carboxyhydrazido, loweralkoxycarbonyl or loweralkylsulfonyl; and $r_4$ and $r_5$ are hydrogen or nitro, provided that one and only one of $r_4$ and $r_5$ is nitro.

Ar in the formula represented by I above preferably represents a phenyl or naphthyl substituent. $r_1$ may be loweralkyl such as methyl, ethyl, propyl, isopropyl, butyl and the like, or it may be a radical represented by $$-(CH_2)_nX$$

where X is a hydroxy, loweralkoxy such as methoxy, ethoxy, propoxy and the like, or halo such as chloro, fluoro, iodo or bromo. In addition to $r_1$ being a loweralkyl group therefore it may also be hydroxyethyl, hydroxypropyl and the like, methoxymethyl, methoxyethyl, methoxypropyl, ethoxyethyl, ethoxypropyl, propoxyethyl, and the like, or 2-chloroethyl, 2-fluoroethyl, 2-bromoethyl, 3-fluoropropyl, 3-iodopropyl, 3-chloropropyl and the like. Halo at the $r_2$ position may be chloro, fluoro, bromo or iodo whereas lower alkoxy may be methoxy, ethoxy, propoxy and the like.

The groups represented by $r_3$ are aryl such as phenyl or naphthyl and the like, halo such as fluoro, chloro, bromo and iodo, loweralkylamino such as methylamino, ethylamino, propylamino and the like, and diloweralkylamino such as dimethylamino, diethylamino, methylethylamino and the like. Also included among the substituents which may be represented by $r_3$ are loweralkylsulfonamido such as methylsulfonamido, ethylsulfonamido and the like, diloweralkylsulfonamido such as dimethylsulfonamido, diethylsulfonamido and the like, loweralkylcarboxamido such as methylcarboxamido, ethylcarboxamido, propylcarboxamido, isopropylcarboxamido and the like, and diloweralkylcarboxamido such as dimethylcarboxamido, diethylcarboxamido, methylethylcarboxamido and the like. There may also be found at this position loweralkanoyl such as acetyl, propionyl, and the like, loweralkyl such as methyl, ethyl, propyl, isopropyl, butyl, propyl and the like, loweralkylaminoloweralkyl such as methylaminomethyl, methylaminoethyl, methylaminopropyl, ethylaminoethyl and the like, diloweralkylaminomethyl such as dimethylaminomethyl, dimethylaminoethyl, methylethylaminomethyl, dimethylaminoethyl and the like, N-morpholinoloweralkyl such as N-morpholinomethyl, N-morpholinoethyl and the like, N-piperidinoloweralkyl such as N-piperidinomethyl, N-piperidinoethyl and the like, N-pyrrolidinoloweralkyl such as N-pyrrolidinomethyl, N-pyrrolidinoethyl and the like, hydroxyethyl, hydroxypropyl and the like, and loweralkylsulfonyl such as methylsulfonyl, ethylsulfonyl and the like. $r_3$ may also be loweralkoxy such as methoxy, ethoxy, propoxy and the like, loweralkylthio such as methylthio, ethylthio and the like, acylamino such as loweralkanoylamino, preferably acetylamino, propionylamino and the like, aroylamino, preferably benzoylamino and the like, and aralkanoylamino, preferably phenylacetylamino and the like, and $r_3$ also represents loweralkoxycarbonyl such as methoxycarbonyl, ethoxycarbonyl, propoxycarbonyl, isopropoxycarbonyl and the like. Other substituents which may be located on the aryl substituent of the compounds of Formula I are loweralkoxy-iminocarbonyl such as methoxyiminocarbonyl, ethoxyiminocarbonyl and the like, loweralkylamidino such as methylamidino, ethylamidino and the like, diloweralkylamidino such as dimethylamidino, diethylamidino, methylethylamidino and the like, and similar substituents.

It should be understood that the 1-unsubstituted nitroimidazoles discussed herein are compounds in which the nitro substituent is at either the 4 or 5 position on the imidazole nucleus. The hydrogen atom on a nitrogen in the imidazole ring is in the state of tautometric equilibrium and the result is an imidazole in which the 4 and 5 positions are equivalent. For convenience, these compounds are herein designated 4-nitroimidazoles.

In accordance with this invention, one method for preparing the novel 1-loweralkyl-2-aryl-5-nitroimidazoles described herein is depicted in the following flow diagram. $r_2$ and $r_3$ are as hereinabove defined and $r_6$ is loweralkyl.

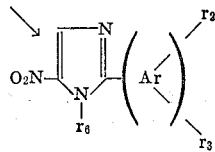

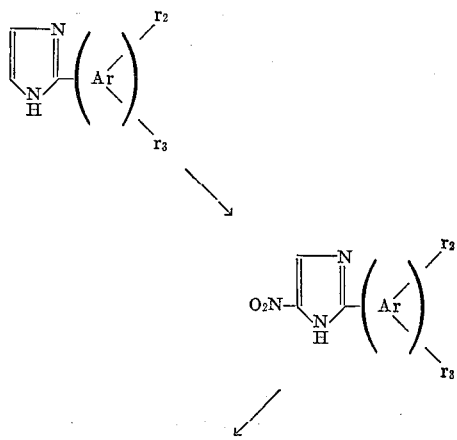

An important feature of the present invention is concerned with the manner of nitrating the 2-aryl imidazole starting compounds. Selective introduction of a nitro substituent on to the imidazole moiety and substantial elimination of aryl radical nitration is usually desired. Certain reactants and reaction conditions have been found desirable in nitrating the starting compounds in the manner preferred. When nitration of a 2-aryl imidazole is carried out on a compound having an electro negative group on the aryl moiety thereof, it has been found that the use of concentrated nitric acid in sulfuric acid solvent affords a compound substituted only on the imidazole ring. For example, nitration using sulfuric and nitric acids produces a nitrosubstituted imidazole when a chloro, nitro or carboxamido substituent is affixed to the aryl radical of the starting aryl imidazole. Depending upon the particular reactants employed, reaction temperatures of the nitration may vary from about room temperature to a temperature as high as the reflux temperature of the acid mixture (about 150–160° C.). The reaction is normally completed in less than an hour and a 20 to 30 minute reaction time is often found to be sufficient. Temperature and reaction time are not critical when preparing these compounds according to the method described and it is only generally desirable to heat the reaction mixture in order that the rate of reaction be conveniently increased. When the formation of the desired nitroimidazole is complete, the product may be isolated and purified by known methods such as by filtration, extraction, removal of solvent under reduced pressure and crystallization of the residual heterocyclic compound.

According to an additional aspect of the invention, nitronium perchlorate and certain nitronium metal fluorides have been found useful as nitrating agents in that they too cause nitro addition on the imidazole moiety in preference to the aryl ring. Nitronium salts comprising anions in a high oxidation state such as nitronium tetrafluoroborate, nitronium hexafluorophosphate, nitronium hexafluoroarsenate, nitronium hexafluorosilicate, nitronium hexafluoroantimonate, nitronium perchlorate and the like, preferably nitronium tetrafluoborate, are useful for this purpose. The use of an inert solvent to bring the imidazole into solution is preferred. Solvents such as acetonitrile, chloroform, nitromethane, dichloroethane, tetramethylenesulfone and the like are suitable for this purpose. The nitration may be conducted at temperatures between about 0° C. and room temperature and above, preferably at about 10–20° C.

The general formula below represents those compounds which are preparable according to the nitration procedure discussed in the preceding paragraph.

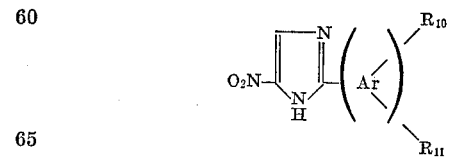

where Ar is aryl; $R_{10}$ is hydrogen, nitro or halo; and $R_{11}$ is hydrogen, loweralkl, aryl, halo, nitro, diloweralkylsulfonamido, cyano, diloweralkylcarboxamido, formyl, loweralkyanoyl, acylaminoloweralkyl, diloweralkylaminoloweralkyl, N'-morpholinoloweralkyl, N'-piperidinoloweralkyl, N'-pyrrolidinoloweralkyl, loweralkoxycarbonyl or loweralkylsulfonyl.

As illustrative of the compounds which may be prepared according to the foregoing nitration procedures, there may be mentioned 2-(4′-chlorophenyl)-4-nitroimidazole,
2-(2′-nitrophenyl)-4-nitroimidazole,
2-(3′,5′-dinitrophenyl)-4-nitroimidazole,
2-(4′-fluorophenyl)-4-nitroimidazole,
N′,N′-dimethyl-2-(4′-carboxamidophenyl)-4-nitroimidazole,
2-(4′-nitrophenyl)-4-nitroimidazole,
2-(3′-sulfonamidophenyl)-4-nitroimidazole,
2-phenyl-4-nitroimidazole,
2-(2′,4′-dichlorophenyl)-4-nitroimidazole,
2-(3′-nitro-4′-chlorophenyl)-4-nitroimidiazole,
2-(2′-fluorophenyl)-4-nitroimidazole,
2-(3′-nitrophenyl)-4-nitroimidazole,
N′-methyl-2-(4′-sulfonamidophenyl)-4-nitroimidiazole,
2-(4′-acetylphenyl)-4-nitroimidazole,
2-(3′-cyanophenyl)-4-nitroimidazole,
2-(2′-aminophenyl)-4-nitroimidazole, and
2-(2′-ethoxycarbonylphenyl)-4-nitroimidazole.

Certain of the compounds of the present invention are substituted at the 1-position on the imidazole moiety with a loweralkyl group by alkylating the 1-unsubstituted imidazoles with agents found useful for this purpose. Alkyl sulfates, preferably loweralkyl sulfates such as dimethyl sulfate, diethyl sulfate and the like, alky sulfonates, preferably loweralkyl sulfonates such as methyl benezenesulfonate, ethyl toluenesulfonate, methyl ethanesulfonate and the like, and diazoalkanes, preferably diazoloweralkanes such as diazomethane, diazoethane and the like may be used in this regard. When preparation of 1-substituted-2-aryl-5-nitroimidazoles rather than 1-substituted-2-aryl-4-nitroimidazoles is desired using these reactants, the conditions under which the reaction is run is critical. It has now been found that 1-substituted-2-aryl-5-nitroimidazoles may be prepared in substantial yields with the above reagents only when the reaction medium is neutral or acidic. Accordingly, when dimethylsulfate is utilized to methylate 2-(2′-nitrophenyl)-4-nitroimidazole, the reaction is conducted under neutral conditions in order that the 5-nitroimidazole be obtained. The alkylation reactions using alkyl sulfate or alkyl sulfonate are generally conducted at temperatures of from about 100–200° C., either with or in the absence of solvent.

When solvent is used during alkylation with alkyl sulfate or alkyl sulfonate, the solvent is preferably inert with respect to the particular reactants employed. Typical examples of solvents useful for such alkylation reactions are loweralkanoic acids such as formic acid, acetic acid and the like, or mixed solvents such as loweralkanoic acid and dimethylformamide and the like.

When a loweralkyl sulfate or loweralkyl sulfonate is employed to obtain 1-loweralkyl-2-aryl-4-nitroimidazole, the reaction is run under basic conditions. The same considerations apply also when the substituent at the 1-position is to be other than 1-loweralkyl. Inasmuch as the 1-substituted-2-aryl-5-nitroimidazoles of this invention display somewhat greater parasiticidal properties than the corresponding 1-substituted-2-aryl-4-nitroimidazoles, a choice of reaction conditions is an important aspect of this invention.

The 1-loweralkyl-2-aryl-nitroimidazoles which may be prepared according to the above-described alkylation processes have the general formulae

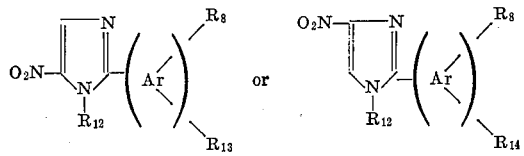

where Ar is aryl; $R_{12}$ is loweralkyl; $R_8$ is hydrogen, nitro, halo, carboxamido or loweralkoxy; $R_{13}$ is hydrogen, loweralkyl, carboxy, aryl, halo, hydroxy, nitro, diloweralkylsulfonamido, loweralkoxy, loweralkylthio, cyano, carboxamido, loweralkylcarboxamido, diloweralkylcarboxamido, formyl, loweralkanoyl, acylaminoloweralkyl, hydroxyloweralkyl, loweralkoxycarbonyl or loweralkylsulfonyl; and $R_{14}$ is hydrogen, loweralkyl, carboxy, aryl, halo, nitro, diloweralkylsulfonamido, loweralkoxy, loweralkylthio, cyano, carboxamido, loweralkylcarboxamido, diloweralkylcarboxamido, formyl, loweralkanoyl, acylaminoloweralkyl, hydroxyloweralkyl, loweralkoxycarbonyl or loweralkylsulfonyl.

It has aso now been discovered that 1-substituted-2-aryl-5-nitroimidazoles are prepared in neutral medium when diazoalkane, preferably lower diazoalkane such as diazomethane, diazoethane and the like is used as alkylating agent. The reagent may be dissolved in inert organic solvent such as ethers, for example diethyl ether, 1,2-dimethoxyethane, tetrahydrofuran and the like, hydrocarbons such as benzene, toluene, xylene and the like, halogenated hydrocarbons such as chloroform and the like, and lower alkanols such as ethanol, propanol and the like. The nitroimidazole is then conveniently treated with the resulting solution at a temperature preferably from about 0° C. to about room temperature in order that 1-alkyl-2-aryl-5-nitroimidazole be produced.

The compounds which may be prepared according to the foregoing alkylation procedure may be represented by the formula

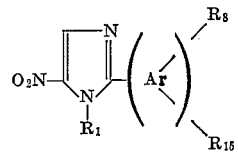

where Ar is aryl; $R_{12}$ is loweralkyl; $R_8$ is hydrogen, halo, nitro, carboxamido or loweralkoxy; and $R_{15}$ is hydrogen, loweralkyl, aryl, halo, loweralkylamino, diloweralkylamino, nitro, diloweralkylsulfonamido, loweralkoxy, loweralkylthio, cyano, carboxamido, loweralkylcarboxamido, diloweralkylcarboxamido, acylaminoloweralkyl, loweralkylaminoloweralkyl, diloweralkylaminoloweralkyl, N′-morpholinoloweralkyl, N′-piperidinoloweralkyl, N′-pyrrolidinoloweralkyl, hydroxyloweralkyl, loweralkoxycarbonyl or loweralkylsulfonyl.

According to the present invention, it has now been found that 2-sulfonamidoaryl-4-nitroimidazole is prepared from 2-aryl-4-nitroimidazole by treating the latter with chlorosulfonic acid at a temperature preferably above room temperature for a time greater than about 24 hours. The crude reaction product is then treated with a source of ammonia, at a temperature of about −30° C. to about 100° C. preferably about 0° C. to about 10° C. to obtain the desired 2-sulfonamidoaryl-4-nitroimidazole. Ammonium hydroxide, anhydrous ammonia and the like, preferably ammonium hydroxide are useful to supply the necessary ammonia. The use of loweralkyl substituted amines, e.g. dimethylamine, in place of an ammonia source give the corresponding N′-loweralkyl or N′,N′-diloweralkyl-2-sulfonamidoaryl-4-nitroimidazole.

When the preparation of 2-(aminoaryl)-4-nitroimidazole is undertaken, the compound may be prepared from 2-(nitroaryl)-4-nitroimidazole by treatment with hydrogen sulfide and ammonia. The reaction temperature is not critical but a reaction temperature above about 50° C. is preferred to reduce reaction time. The reaction mixture is then acidified by convenient means preferably by addition of a strong mineral acid such as hydrochloric acid. The sulfur precipitate is then removed by filtration and the product is extracted by conventional means such as by use of inert organic solvent such as ethyl acetate. When this product is to be substituted at the 1-position, the usual practice of protecting an amino group by acylation is carried out. The 1-substituted-2-(aminoaryl) nitroimidazole is then conveniently obtained by hydrolyzing the acylated aminoaryl compound with a mineral acid such as hydrochloric acid.

The following compounds are illustrative of those which may be prepared according to the foregoing processes:

1-methyl-2-phenyl-5-nitroimidazole,
1-methyl-2-(4'-tolyl)-5-nitroimidazole,
1-methyl-2-(3'-tolyl)-4-nitroimidazole,
1-methyl-2-(2-β-chloroethylphenyl)-5-nitroimidazole,
1-methyl-2-(3-β-fluoropropylphenyl)-5-nitroimidazole,
1-methyl-2-(3'-nitrophenyl)-4-nitroimidazole,
1-methyl-2-(2'-cyanophenyl)-5-nitroimidazole,
1-methyl-2-(4'-formylphenyl)-5-nitroimidazole,
1,N'-dimethyl-2-(2'-aminomethylphenyl)-5-nitroimidazole,
1,N',N'-trimethyl-2-(3'-sulfonamidophenyl)-4-nitroimidazole,
1-methyl-2-(4'-bromophenyl)-5-nitroimidazole,
1-methyl-2-(3'-acetylaminophenyl)-5-nitroimidazole,
1-n propyl-2-(4'-biphenylyl)-4-nitroimidazole,
1-methyl-2-(4'-methylsulfonylphenyl)-5-nitroimidazole,
1-methyl-2-(2'-aminophenyl)-5-nitroimidazole,
1-methyl-2-(3'-aminophenyl)-5-nitroimidazole,
1-ethyl-2-(4'-aminophenyl)-5-nitroimidazole,
1-methyl-2-(3'-fluorophenyl)-5-nitroimidazole,
1-methyl-2-(2'-chlorophenyl)-5-nitroimidazole,
1-methyl-2-(4'-chlorophenyl)-4-nitroimidazole,
1-methyl-2-(4'-morpholinomethylphenyl)-5-nitroimidazole,
1-methyl-2-(3'-methylthiophenyl)-5-nitroimidazole,
1-methyl-2-(2'-carboxamidophenyl)-5-nitroimidazole,
1-methyl-2-(2'-iodophenyl)-5-nitroimidazole,
1-methyl-2-(4'-nitrophenyl)-4-nitroimidazole,
1-ethyl-2-(2'-nitrophenyl)-5-nitroimidazole,
1-isopropyl-2-(4'-fluorophenyl)-5-nitroimidazole,
1-methyl-2-(3'-piperidinomethyl)-5-nitroimidazole,
1-methyl-2-(4'-acetylaminoethyl)-5-nitroimidazole,
1-methyl-2-(3'-ethoxyphenyl)-5-nitroimidazole,
1-methyl-2-(2'-nitro-3'-chlorophenyl)-5-nitroimidazole,
1-ethyl-2-(2'-chloro-4'-methylphenyl)-5-nitroimidazole,
1-ethyl-2-(4'-nitrophenyl)-5-nitroimidazole,
1-ethyl-2-(4'-chloro-2'-aminophenyl)-5-nitroimidazole,
1-propyl-2-(3'-methoxyphenyl)-5-nitroimidazole,
1-propyl-2-(2'-nitro-3'-sulfonamido)-5-nitroimidazole,
1-methyl-2-(2'-chloro-4'-pyrrolidinomethylphenyl)-5-nitroimidazole,
1-methyl-2-(3'-methyl-4'-carboxamidophenyl)-5-nitroimidazole,
1,N'-dimethyl-2-(4'-carboxamidophenyl)-5-nitroimidazole,
1-methyl-N'-ethyl-2-(2'-sulfonamidophenyl)-5-nitroimidazole,
1-methyl-2-(4'-ethoxycarbonylphenyl)-5-nitroimidazole,
1-methyl-2-(2',4'-dichlorophenyl)-5-nitroimidazole,
1-methyl-2-(2',4'-difluorophenyl)-5-nitroimidazole,
1-methyl-2-(2'-aminopropylphenyl)-4-nitroimidazole,
1-N'-diethyl-2-(4'-aminophenyl)-5-nitroimidazole,
1,N'-dimethyl-2-(4'-sulfonamidophenyl)-5-nitroimidazole,
1,N',N'-trimethyl-2-(4'-aminophenyl)-5-nitroimidazole,
1-methyl-N'-ethyl-2-(3'-nitro-4'-sulfonamidophenyl)-5-nitroimidazole,
1-methyl-2-(3'-acetylphenyl)-5-nitroimidazole,
1-methyl-2-(3'-ethylphenyl)-5-nitroimidazole,
1-methyl-2-(2'-propylphenyl)-5-nitroimidazole,
1-ethyl-2-(4'-β-fluoroethylphenyl)-5-nitroimidazole,
1-methyl-2-(2'-chloronaphthyl)-5-nitroimidazole,
1-methyl-2-(3'-fluoronaphthyl)-5-nitroimidazole,
1-methyl-2-(5'-fluoronaphthyl)-5-nitroimidazole,
1-methyl-2-(3'-nitronaphthyl)-5-nitroimidazole,
1-methyl-2-(2'-aminonaphthyl)-4-nitroimidazole,
1-ethyl-2-(2',3'-dichloronaphthyl)-5-nitroimidazole,
1-ethyl-2-(2'-methylnaphthyl)-5-nitroimidazole,
1-methyl-2-(3'-carboxamidonaphthyl)-5-nitroimidazole, and
1-ethyl-2-naphthyl-5-nitroimidazole.

When the 1 - haloloweralkyl - 2 - aryl - 5 - nitroimidazoles of the present invention are prepared by halo alkylation of a 2-aryl nitroimidazole, substantially identical reaction conditions as those used for the alkylation reactions are satisfactory. No significant difference between use of the alkylating or halo alkylating agent is necessary to achieve a corresponding result. Consequently, when a haloloweralkyl sulfate such as 2-chloroethyl sulfate, 3-chloropropyl sulfate and the like, or a haloloweralkyl sulfonate such as 2-chloroethyltoluene sulfonate and the like, or a halodiazoloweralkane such as 2-chloro-1-diazoethane and the like is used in treating the 2-aryl-4-nitroimidazole of the invention, a 1 - haloloweralkyl-2 - aryl - 5 - nitroimidazole or 1 - haloloweralkyl - 2 - aryl-4-nitroimidazole will result.

The 1 - haloloweralkyl - 2 - aryl - nitroimidazoles capable of preparation according to the foregoing have the formula

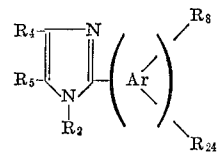

where Ar is aryl; $R_{23}$ is haloalkyl; $R_8$ is hydrogen, halo, nitro, carboxamido or loweralkoxy; $R_{24}$ is hydrogen, loweralkyl, carboxy, aryl, halo, hydroxy, nitro, carboxamido, loweralkoxy, loweralkylthio, formyl, loweralkanoyl, acylaminoloweralkyl, diloweralkylsulfonamido, hydroxyloweralkyl, loweralkoxycarbonyl or loweralkylsulfonyl; and $R_4$ and $R_5$ are hydrogen or nitro, provided one and only one of $R_4$ and $R_5$ is nitro.

The 1- loweralkoxyloweralkyl or 1-hydroxyloweralkyl-2-aryl-5-nitroimidazoles of this invention may be prepared by reacting a 2-aryl-4-nitroimidazole and an aryl sulfonate such as a loweralkoxyloweralkyl toluene sulfonate or the like at moderate temperature, preferably about 150° C. to about 200° C. Loweralkoxyloweralkyl sulfates are also useful reagents in this regard. Standard extraction methods may then be utilized to obtain the 1 - loweralkoxyloweralkyl - 2 - aryl - 5 - nitroimidazole. Hydrolysis of the 1 - loweralkoxyloweralkyl - 2 - aryl-5-nitroimidazoles by treatment, for example, with a strong mineral acid such as sulfuric acid converts that compound to the corresponding 1 - hydroxyloweralkyl-5 - nitroimidazole. The 1 - substituted - 2 - aryl - 4 - nitroimidazoles are obtained when the reaction medium is basic. As illustrative of the aryl sulfonates useful in the above reaction, there may be mentioned methoxyethyltoluene sulfonate, ethoxyethyltoluene sulfonate, propoxyethyltoluene sulfonate, ethoxypropylbenzene sulfonate and the like, whereas among the loweralkoxyloweralkyl sulfates useful as reagents in the above-described process, there may be mentioned di(ethoxyethyl)sulfate, di(ethoxypropyl)sulfate, di(methoxyethyl)sulfate and the like. Loweralkoxy diazoloweralkanes such as methoxydiazoethane, ethoxydiazoethane and the like are also useful in preparing the 1-loweralkoxyloweralkyl and 1-hydroxyloweralkyl - 2 - aryl - 5 - nitroimidazole in accordance with the above-described process.

The compounds prepared according to the loweralkoxyalkylation and hydroxyalkylation processes described above may be represented by the formulae

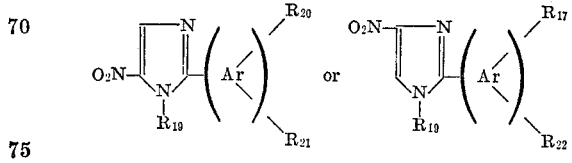

when Ar is aryl; $R_{19}$ is $(CH_2)_nY$, where $n$ 2–4 and Y when Ar is aryl; $R_{19}$ is $(CH_2)_nY$, where $n$ is 2—4 and Y is hydroxy or loweralkoxy; $R_{20}$ is hydrogen, halo, nitro or loweralkoxy; $R_{21}$ is hydrogen, loweralkyl carboxy, aryl, halo, hydroxy, nitro, loweralkoxy, loweralkylthio, formyl, loweralkanoyl, acylaminoloweralkyl, diloweralkylsulfonamido, hydroxyloweralkyl, loweralkoxycarbonyl or loweralkylsulfonyl; $R_{17}$ is hydrogen, halo, nitro, amino or loweralkoxy; and $R_{22}$ is hydrogen, loweralkyl, carboxy, aryl, halo, nitro, amino, loweralkoxy, loweralkylthio, formyl, loweralkanoyl, acylaminoloweralkyl, diloweralkylaminoloweralkyl, diloweralkylsulfonamido, hydroxyloweralkyl, loweralkoxycarbonyl or loweralkylsulfonyl.

As illustrative of some specific compounds which may be prepared according to the processes described above, there may be mentioned:

1-(2′-chloroethyl)-2-(4′-chlorophenyl)-5-nitroimidazole,
1-(2′-hydroxyethyl)-2-(4′-nitrophenyl)-5-nitroimidazole,
1-(2′-chloroethyl)-2-phenyl-5-nitroimidazole,
1-(3′-hydroxypropyl)-2-(3′-methylthiophenyl)-4-nitroimidazole,
1-(2′-bromoethyl)-2-(biphenylyl)-5-nitroimidazole,
1-(2′-hydroxyethyl)-2-(3′,4′-dichlorophenyl)-5-nitroimidazole,
1-(2′-fluoroethyl)-2-(4′-fluorophenyl)-5-nitroimidazole,
1-(2′-hydroxyethyl)-2-(3′-tolyl)-5-nitroimidazole,
1-(2′-hydroxyethyl)-2-(2′-nitrophenyl)-4-nitroimidazole,
1-(3′-fluorophenyl)-2-(3′-ethoxycarbonylphenyl)-5-nitroimidazole,
1-(2′-hydroxyethyl)-2-(4′-methylsulfonyphenyl)-5-nitroimidazole,
1-(2′-chloroethyl)-2-(4′-acetylaminomethylphenyl)-5-nitroimidazole,
1-(2′-chloroethyl)-2-(4′-carboxyphenyl)-5-nitroimidazole and
1-(2′-hydroxyethyl)-2-(3′-formylphenyl)-4-nitroimidazole.

The 2-aryl imidazoles employed as starting materials in the present invention may be prepared according to synthetic methods presently known in the literature. One method for preparing these compounds involves reaction of an appropriately substituted aromatic nitrile such as benzonitrile with a loweralkanol and a strong mineral acid. This reaction is preferably conducted at about 0–10° C. for up to about 14 days depending on the reactants used. The resulting product, a loweralkyl aryl imidate hydrochloride, is then treated with an amino acetaldehyde acetal in a suitable solvent, preferably a loweralkanol such as methanol at temperatures ranging from about 0° C. to room temperature. These temperatures are determined according to the particular reactants used. This reaction may be generally represented as follows:

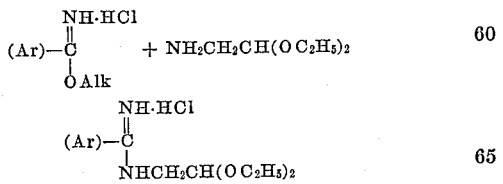

Treatment of the resulting amidine with acid such as a concentrated mineral acid and then with a base such as a lower alkali or a lower alkaline earth metal hydroxide produces the 2-aryl imidazole desired.

The 1-substituted-2-aryl-5-nitroimidazoles, 1-substituted-2-aryl-4-nitroimidazoles, and structurally related isoindoles and dihydroisoquinolines of this invention are effective in the control of enterohepatitis in turkeys. For this purpose they may be administered to turkeys mixed with an element of turkey sustenance, e.g. feed or drinking water. Good control of the disease is obtained when the imidazole compounds of the invention are incorporated in a turkey feed ration at levels of from about 0.003% to about 0.1% by weight and preferably from about 0.006% to 0.05% by weight of the feed. The optimum concentration will depend to a large extent on the age of the birds, the severity of the infection and the particular compound employed. With these feed levels good control of the disease is obtained with no or minimal side effects or growth retardation of the turkeys.

When the poultry feed or poultry ration is employed as carrier for the active compounds of the present invention, it is desired that the drug be uniformly mixed throughout the feed. This may be accomplished by first preparing a premix or feed supplement composition wherein the active ingredient is present in concentrations of from about 1% to about 50% by weight and where the carrier or diluent is a nontoxic orally ingeatible carrier. It is preferred that the carrier be a nutritive one, for example corn distillers dried grains, corn gluten feed, corn cob meal, edible vegetable substances, condensed fish solubles, brewers' yeast, whey, alfalfa, citrus meal, molasses solubles, soybean mill feed, antibiotic mycelia, toasted dehulled soya flour, soya grits, wheat shorts, wheat middlings, soybean meal, fermentation residues or corn meal. The supplements or premixed are then intimately and uniformly mixed with the remainder of the poultry ration by conventional techniques such as grinding or milling.

When the active compounds are administered by way of drinking water of the poultry which method is preferred when the birds are severely infected (the birds will normally continue to drink after they have stopped eating solid food), somewhat higher dose levels are employed than when administered with solid feed. The quantities of active agent which are useful are those in which from about 0.01% to about 0.1% by weight of water are utilized. Some of the nitroimidazoles of the invention are not highly water soluble and when such compounds are added to drinking water it is desirable that suspending or emulsifying agents also be used to render the compound more effective in such form. A water soluble form of the drug may be utilized in a similar fashion.

The feed levels at which representative members of the compounds of the invention are active in controlling histomoniasis in turkeys are as follows:

| Compound: | Percent by weight in feed |
|---|---|
| 1-methyl-2-phenyl-5-nitroimidazole | .025 |
| 1-methyl-2-(2′-nitrophenyl)-5-nitroimidazole | .0125 |
| 1-methyl-2-(3′-nitrophenyl)-5-nitroimidazole | .0125 |
| 1-methyl-2-(4′-nitrophenyl)-5-nitroimidazole | .006 |
| 1-methyl-2-(4′-chlorophenyl)-5-nitroimidazole | .025 |
| 1-methyl-2-(4′-aminophenyl)-5-nitroimidazole | .025 |
| 1-methyl-2-(3′-sulfonamidophenyl)-5-nitroimidazole | .025 |
| 1-methyl-2-(4′-fluorophenyl)-5-nitroimidazole | .006 |
| 1-methyl-2-(3′,5′-dinitrophenyl)-5-nitroimidazole | .025 |

The 1-substituted-2-aryl-5(or 4)-nitroimidazoles of the present invention are also useful as topical trichomonacides. When employing the compounds in this manner, one or more of the active agents are uniformly distributed in a suitable chemotherapeutic vehicle that is chemically compatible with the particular compound selected, non-inhibiting with respect to the action of the effective agent upon *Trichomonas vaginalis* and essentially non-injurious to body tissue under the conditions of use. The vehicle is preferably a semi-liquid or semi-solid type and the final preparation may be in the form of a suppository, if desired.

Oil and water types of emulsions or creams as well as aqueous jellies such as those prepared with the aid of any of a number of commercially used jelling agents including acacia, tragacanth, bentonite, alginic acid and the like are suitable vehicles. The vehicle may also be a viscous aqueous jell containing one or more cellulose derivatives such as methyl cellulose, hydroxyethyl cellulose, and sodium carboxy methyl cellulose. Jelling agents such as pectin, gum tragacanth, sodium alginate and other vegetable jelling agents are also useful vehicles in this regard.

The following examples are given for the purpose of illustration and not by way of limitation.

EXAMPLE 1

2-phenyl-4-nitroimidazole 311.5 gm. (2.16 mol) of 2-phenyl imidazole in 800 ml. of stirred, ice-cooled chloroform is treated in small portions over about one hour with 156.1 gm. (1.17 mol) of nitronium fluoborate. The rate of addition is such to maintain the temperature of the reaction mixture at 10–20° C. The mixture is further stirred for two hours at room temperature and poured into 2.5 l. of .5 N aqueous sodium hydroxide. The chloroform phase is extracted twice with 400 ml. of .5 N sodium hydroxide and the combined basic extracts are made acidic with concentrated hydrochloric acid. The precipitated material in the acidic solution is extracted three times with chloroform, leaving a clear aqueous phase and a dark viscous insoluble oil. 25.5 gm. of insoluble oil is isolated by decantation of the aqueous supernatant. This is combined in 600 ml. acetone with the 31.2 gm. of partially crystalline material obtained by evaporation of the combined chloroform extracts. The acetone solution is diluted with sufficient ether to cause heavy cloudiness and is chromatographed over an intimate mixture of 120 gm. decolorizing charcoal and 120 gm. Supercel using first 1:1 (v./v.) acetone-ether and then acetone as eluting solvents. After evaporation of the eluate, the residue is recrystallized from methanol-water to give 2-phenyl-4-nitroimidazole; M.P. 235–242° C. An analytical sample obtained by recrystallization and sublimation melts at 243.5–244.5° C.

2-phenyl-4-nitroimidazole is also obtained when nitronium hexafluorophosphate, nitronium hexafluoroarsenate, nitronium hexafluorosilicate, nitronium hexafluoroantimonate or nitroniumperchlorate is used in place of nitronium fluoborate in the above reaction.

When the above procedure is carried out using 2-(4'-tolyl) imidazole in place of 2-phenyl imidazole, there is obtained 2-(4'-tolyl)-4-nitroimidazole; M.P. 235–237° C.

When the above process is carried out and 2-(4'-biphenylyl) imidazole,
2-(4'-fluorophenyl) imidazole,
2-(3'-nitrophenyl) imidazole,
N'N'-dimethyl-2-(3'-sulfonamidophenyl) imidazole,
2-(4'-cyanophenyl) imidazole,
N',N'-dimethyl-2-(4'-carboxamidophenyl) imidazole,
2-(4'-formylphenyl) imidazole,
2-(2'-acetylphenyl) imidazole,
2-(4'acetylaminomethylphenyl) imidazole,
N',N'-diethyl-2-(4'-aminomethylphenyl) imidazole,
2-(4'-N'-morpholinomethylphenyl) imidazole,
2-(4'-N'-piperidinomethylphenyl) imidazole,
2-(4'-N'-pyrrolidinomethylphenyl) imidazole,
2-(2'-methoxycarbonylphenyl) imidazole or
2-(4'-methylsulfonylphenyl) imidazole is used in place of 2-phenyl imidazole, there is obtained 2-(4'-biphenyly)-4-nitroimidazole,
2-(4'-fluorophenyl)-4-nitroimidazole,
2-(3'-nitrophenyl)-4-nitroimidazole,
N',N'-dimethyl-2-(3'-sulfonamidophenyl)-4-nitroimidazole,
2-(4'-cyanophenyl)-4-nitroimidazole,
N',N'-dimethyl-2-(4'-carboxamidophenyl)-4-nitroimidazole,
2-(4'-formylphenyl)-4-nitroimidazole,
2-(2'-acetylphenyl)-4-nitroimidazole,
2-(4'-acetylaminomethylphenyl)-4-nitroimidazole,
N',N'-diethyl-2-(4'-aminomethylphenyl)-4-nitroimidazole,
2-(4'-N'-morpholinomethylphenyl)-4-nitroimidazole,
2-(4'-N'-piperidinomethylphenyl)-4-nitroimidazole,
2-(4'-N'-pyrrolidinomethylphenyl)-4-nitroimidazole,
2-(2'-methoxycarbonylphenyl)-4-nitroimidazole or
2-(4'-methylsulfonylphenyl)-4-nitroimidazole, respectively.

EXAMPLE 2

1-methyl-2-phenyl-5-nitroimidazole 143 mg. (.76 mmol.) of 2-phenyl-4-nitroimidazole and 99 mg. (.79 mmol.) of methyl sulfate are heated together at 120° C. for 30 minutes. The reaction mixture is cooled and dissolved by shaking with a mixture of 3 ml. of dilute aqueous sodium hydroxide and 3 ml. of chloroform. The chloroform phase is dried over sodium sulfate and evaporated to dryness yielding crystalline 1-methyl-2-phenyl-5-nitroimidazole. After recrystallization from ethyl acetate this material melts at 157–160° C. After further recrystallization and sublimation, the melting point is 160–161° C.

When the above process is carried out using 2-(4'-tolyl)-4-nitroimidazole in place of 2-phenyl-4-nitroimidazole in place of 2-phenyl-4-nitroimidazole, there is obtained 1-methyl-2-(4'-tolyl)-5-nitroimidazole; M.P. 138–140° C.

When the above process is carried out using β-chloroethyl sulfate in place of methyl sulfate, there is obtained 1-β-chloroethyl-2-phenyl-5-nitroimidazole.

The substitution of ethyl sulfate for methyl sulfate in the above reaction affords 1-ethyl-2-(4'-fluorophenyl)-5-nitroimidazole as the product.

When the above process is carried out and 2-(4'-tolyl)-4-nitroimidazole,
2-(4'-carboxyphenyl)-4-nitroimidazole,
2-(4'-biphenylyl)-4-nitroimidazole,
2-(4'-fluorophenyl)-4-nitroimidazole,
2-(2'-hydroxyphenyl)-4-nitroimidazole,
2-(2'-nitrophenyl)-4-nitroimidazole,
N',N'-dimethyl-2-(3'-sulfonamidophenyl)-4-nitroimidazole,
2-(2'-ethoxyphenyl)-4-nitroimidazole,
2-(4'-methylthiophenyl)-4-nitroimidazole,
2-(2'-cyanophenyl)-4-nitroimidazole,
2-(4'-carboxamidophenyl)-4-nitroimidazole,
N'-methyl-2-(4'-carboxamidophenyl)-4-nitroimidazole,
N',N'-dimethyl-2-(4'-carboxamidophenyl)-4-nitroimidazole,
2-(2'-formylphenyl)-4-nitroimidazole,
2-(2'-acetylphenyl)-4-nitroimidazole,
2-(2'-acetylaminomethylphenyl)-4-nitroimidazole,
2-(2'-hydroxymethylphenyl)-4-nitroimidazole,
2-(4'-ethoxycarbonylphenyl)-4-nitroimidazole or
2-(2'-methylsulfonylphenyl)-4-nitroimidazole
is used in place of
2-phenyl-4-nitroimidazole,
there is obtained
1-methyl-2-(4'-tolyl)-5-nitroimidazole,
1-methyl-2-(4'-carboxyphenyl)-5-nitroimidazole,
1-methyl-2-(4'-biphenylyl)-5-nitroimidazole,
1-methyl-2-(4'-fluorophenyl)-5-nitroimidazole,
1-methyl-2-(2'-hydroxyphenyl)-5-nitroimidazole,
1-methyl-2-(2'-nitrophenyl)-5-nitroimidazole,
1,N',N'-trimethyl-2-(3'-sulfonamidophenyl)-5-nitroimidazole, 1-methyl-2-(2'-ethoxyphenyl)-5-nitroimidazole,
1-methyl-2-(4'-methylthiophenyl)-5-nitroimidazole,
1-methyl-2-(2'-cyanophenyl)-5-nitroimidazole,
1-methyl-2-(4'-carboxamidophenyl)-5-nitroimidazole,
1,N'-dimethyl-2-(4'-carboxamidophenyl)-5-nitroimidazole,
1,N',N'-trimethyl-2-(4'-carboxamidophenyl)-5-nitroimidazole,
1-methyl-2-(2'-formylphenyl)-5-nitroimidazole,
1-methyl-2-(2'-acetylphenyl)-5-nitroimidazole,
1-methyl-2-(2'-acetylaminomethylphenyl)-5-nitroimidazole,
1-methyl-2-(2'-hydroxymethylphenyl)-5-nitroimidazole,
1-methyl-2-(4'-ethoxycarbonylphenyl)-5-nitroimidazole, or
1-methyl-2-(2'-methylsulfonylphenyl)-5-nitroimidazole,
respectively.

When the above processes are carried out using methyl toluene sulfonate in place of methyl sulfate, the corresponding 1-methyl-2-aryl-5-nitroimidazole again results.

When di(β-chloroethyl)sulfate or β-chloroethyl toluene sulfonate is used in place of methyl sulfate in the above processes, the corresponding 1-(2'-chloroethyl)-2-aryl-5-nitroimidazoles are obtained.

EXAMPLE 3

1-methyl-2-(4'-fluorophenyl)-5-nitroimidazole

A sample of 4 gm. of 2-(4'-fluorophenyl)-4-nitro-imidazole is dissolved in 200 ml. of warm 1,2-dimethoxy ethane, treated with charcoal, filtered and cooled in an ice bath. Excess ethereal diazomethane (130 ml.) is added in small portions and the reaction mixture is allowed to cool for two hours. The excess diazomethane is boiled off in a fume hood and the solution is then evaporated to near dryness in vacuo. The residue is recrystallized from acetone-ether to give 1-methyl-2-(4'-fluorophenyl)-5-nitroimidazole; M.P. 166–167° C.

When the above process is carried out and 2-phenyl-4-nitroimidazole,
2-(4'-tolyl)-4-nitroimidazole,
2-(4'-biphenylyl)-4-nitroimidazole,
2-(4'-chlorophenyl)-4-nitroimidazole,
N'-methyl-2-(2'-aminophenyl)-4-nitroimidazole,
N',N'-dimethyl-2-(2'-aminophenyl)-4-nitroimidazole,
2-(4'-nitrophenyl)-4-nitroimidazole,
N',N'-dimethyl-2-(3'-sulfonamidophenyl)-4-nitroimidazole,
2-(2'-methoxyphenyl)-4-nitroimidazole,
2-(4'-methylthiophenyl)-4-nitroimidazole,
2-(4'-cyanophenyl)-4-nitroimidazole,
2-(4'-carboxamidophenyl)-4-nitroimidazole,
N'-methyl-2-(4'-carboxyamidophenyl)-4-nitroimidazole,
N',N'-dimethyl-2-(4'-carboxamidophenyl)-4-nitroimidazole,
2-(4'-acetylaminomethylphenyl)-4-nitroimidazole,
N'-methyl-2-(2'-aminomethylphenyl)-4-nitroimidazole,
N',N'-diethyl-2-(4'-aminomethylphenyl)-4-nitroimidazole,
2-(4'-N'-morpholinomethylphenyl)-4-nitroimidazole,
2-(4'-N'-piperidinomethylphenyl)-4-nitroimidazole,
2-(4'-N'-pyrrolidinomethylphenyl)-4-nitroimidazole,
2-(2'-hydroxyethylphenyl)-4-nitroimidazole,
2-(2'-methoxycarbonylphenyl)-4-nitroimidazole, or
2-(4'-methylsulfonylphenyl)-4-nitroimidazole
is used in place of
2-(4'-fluorophenyl)-4-nitroimidazole,
there is obtained
1-methyl-2-phenyl-5-nitroimidazole,
1-methyl-2-(4'-tolyl)-5-nitroimidazole,
1-methyl-2-(4'-biphenylyl)-5-nitroimidazole,
1-methyl-2-(4'-chlorophenyl)-5-nitroimidazole,
1,N'-dimethyl-2-(2'-aminophenyl)-5-nitroimidazole,
1,N',N'-trimethyl-2-(2'-aminophenyl)-5-nitroimidazole,
1-methyl-2-(4'-nitrophenyl)-5-nitroimidazole,
1,N',N'-trimethyl-2-(3'-sulfonamidophenyl)-5-nitroimidazole,
1-methyl-2-(2'-methoxyphenyl)-5-nitroimidazole,
1-methyl-2-(4'-methylthiophenyl)-5-nitroimidazole,
1-methyl-2-(4'-cyanophenyl)-5-nitroimidazole,
1-methyl-2-(4'-carboxamidophenyl)-5-nitroimidazole,
1,N'-dimethyl-2-(4'-carboxamidophenyl)-5-nitroimidazole,
1,N',N'-trimethyl-2-(4'-carboxamidophenyl)-5-nitroimidazole,
1-methyl-2-(4'-acetylaminomethylphenyl)-5-nitroimidazole,
1,N'-dimethyl-2-(2'-aminomethylphenyl)-5-nitroimidazole,
1-methyl-N',N'-diethyl-2-(4'-aminomethylphenyl)-5-nitroimidazole,
1-methyl-2-(4'-N'-morpholinomethylphenyl)-5-nitroimidazole,
1-methyl-2-(4'-N'-piperidinomethylphenyl)-5-nitroimidazole,
1-methyl-2-(4',N'-pyrrolidinomethylphenyl)5-nitroimidazole,
1-methyl-2-(2'-hydroxyethylphenyl)-5-nitroimidazole,
1-methyl-2-(2'-methoxycarbonylphenyl)-5-nitroimidazole or
1-methyl-2-(4'-methylsulfonylphenyl)-5-nitroimidazole,
respectively.

EXAMPLE 4

1-methyl-2-(4'-chlorophenyl)-5-nitroimidazole

A mixture of 4.46 gm. of 2-(4'-chlorophenyl)-4-nitroimidazole and 2 ml. of dimethyl sulfate is heated for 35 minutes at 155–160° C. The mixture is cooled and agitated in a mixture of 500 ml. of 0.5 N sodium hydroxide and 500 ml. of chloroform. The chloroform layer is washed with water, dried over sodium sulfate and concentrated to a residue. This residue is recrystallized from ethyl acetate to give 1-methyl-2-(4'-chlorophenyl)-5-nitroimidazole; M.P. 137–138° C.

EXAMPLE 5

1-methyl-2-(2'-nitrophenyl)-5-nitroimidazole

To 2.13 ml. of dimethyl sulfate is added 5.0 gm. of 2-(2'-nitrophenyl)-4-nitroimidazole. The mixture is heated for two hours at a temperature of 150° C. The reaction mixture is cooled and added to a mixture of 1.25 N sodium hydroxide and chloroform. The resulting solution is extracted with five 300 ml. portions of chloroform and the chloroform is then removed by evaporation in vacuo. The residue is recrystallized from acetone-ether and gives 1-methyl-2-(2'-nitrophenyl)-5-nitroimidazole; M.P. 143–145° C.

EXAMPLE 6

1-methyl-2-(3',5'-dinitrophenyl)-5-nitroimidazole 5 gm. of 2-(3',5'-dinitrophenyl)-4-nitroimidazole is dissolved in 100 ml. of 1,2-dimethoxy ethane and cooled in an ice bath. An excess of ethereal diazomethane is added and the resulting mixture is allowed to stand at room temperature overnight. The reaction mixture is then evaporated in vacuo and the residue is dissolved in acetone. The resulting solution is treated with charcoal, evaporated and the residue is triturated with hexane. The crystalline product is recrystallized from hexane giving 1-methyl-2-(3',5'-dinitrophenyl) - 5 - nitroimidazole; M.P. 195–198° C.

When 2-chloro-1-diazoethane is used in place of diazomethane in the above process, there will result 1-(2'-chloroethyl)-2-(3',5'-dinitrophenyl)-5-nitroimidazole.

EXAMPLE 7

1-methyl-2-(3',4'-dichlorophenyl)-5-nitroimidazole 2 gm. of 2-(3',4'-dichlorophenyl)-4-nitroimidazole is dissolved in 20 ml. of 1,2-dimethoxy ethane and treated with an excess of diazomethane in ether. The reaction mixture is then heated on the steam cone and evaporated to a small volume. The residue is then dissolved in ether, passed through an alumina filtration column and evaporated to dryness in vacuo. Recrystallization from benzene gives the product, 1-methyl-2-(3',4'-dichlorophenyl)-5-nitroimidazole; M.P. 147–148° C.

When 2-(4'-morpholinophenyl-4-nitroimidazole, 2-(4'-pyrrolidinophenyl)-4-nitroimidazole, 2 - (4'-piperadinophenyl)-4-nitroimidazole or 2-(3'-acetylaminomethylphenyl)-4-nitroimidazole is used in the above process in place of 2-(3',4'-dichlorophenyl)-4-nitroimidazole, there is obtained
1-methyl-2-(4'-morpholinophenyl)-5-nitroimidazole,
1-methyl-2-(4'-pyrrolidinophenyl)-5-nitroimidazole,
1-methyl-2-(4'-piperadinophenyl)-5-nitroimidazole or
1-methyl-2-(3'-acetylaminomethylphenyl)-5-nitroimidazole,
respectively.

EXAMPLE 8

1-methyl-2-(2'-fluorophenyl)-5-nitroimidazole

A mixture of 2-(2'-fluorophenyl)-4-nitroimidazole (1.00 gm.) and dimethyl sulfate (0.4 cc.) is heated for thirty minutes at 113° C. The mixture is cooled and agitated with 0.5 N sodium hydroxide and chloroform. The chloroform extracts are washed with water and dried over sodium sulfate and concentrated to a residue which is recrystallized from ethyl acetate giving 1-methyl-2-(2'-fluorophenyl)-5-nitroimidazole; M.P. 163–165° C.

EXAMPLE 9

1-methyl-2-(2'-naphthyl)-5-nitroimidazole

A solution of 349 gm. (1.36 mmol.) of 2-(2'-naphthyl)-4-nitroimidazole hydrate in 10 ml. ethylene glycol dimethyl ether is treated with a 250% excess of diazomethane in 10 ml. of ether with cooling in ice. The solvents are evaporated at atmosphere pressure and in vacuo. The brown crystalline residue is extracted three times with boiling ether and the cooled combined extracts are filtered through 5.0 gm. of basic aluminum oxide. After washing the aluminum oxide with further ether, the eluate is evaporated in vacuo to leave a pale yellow crystalline residue of 1-methyl-2-(2'-naphthyl)-5-nitroimidazole. This is recrystallized from methanol to give a product melting at 158–160° C.

When the above process is carried out using 2-(3'-fluoro-2'-naphthyl-4-nitroimidazole in place of 2-(2'-naphthyl)-4-nitroimidazole, there is obtained 1-methyl-2-(3'-fluoro-2'-naphthyl)-4-nitroimidazole.

Similarly, when 2-(3'-nitro-2'-naphthyl)-4-nitroimidazole, 2-(4'-fluoro-2'-naphthyl)-4-nitroimidazole or 2-(2'-carboxamido-3'-naphthyl)-4-nitroimidazole is used in place of 2-(2'-naphthyl)-4-nitroimidazole, there is obtained 1-methyl-2-(3'-nitro-2-naphthyl)-5-nitroimidazole, 1-methyl - 2 - (4' - fluoro-2-naphthyl)-5-nitroimidazole or 1-methyl - 2 - (2' - carboxamido-3'-naphthyl)-5-nitroimidazole, respectively.

EXAMPLE 10

2-(4'-acetylaminophenyl)-4-nitroimidazole

Into a solution of 62 gm. of 2-(4'-nitrophenyl)-4-nitroimidazole in a mixture of 420 ml. ethanol and 210 ml. of concentrated ammonia is bubbled a stream of hydrogen sulfide for ½ hour. The solution is refluxed ½ hour, treated with 27 ml. concentrated ammonia, and hydrogen sulfide is again bubbled through for ½ hour. After a second ½ hour reflux the ammonia-hydrogen sulfide addition and reflux procedure is repeated. Ethanol is removed in vacuo, water is added, and the mixture is acidified with hydrochloric acid. The insoluble sulfur is filtered off and the filtrate is extracted with ethyl acetate. After neutralization with sodium hydroxide, the aqueous phase is filtered to give crude, dark 2-(4'-aminophenyl)-4-nitroimidazole.

32.3 gm. of the crude reduction product is heated 1¾ hours on the steam bath with a large excess of acetic anhydride. The mixture is cooled and the dark precipitate of 2-(4'-acetylaminophenyl)-4-nitroimidazole is filtered off and washed with acetone.

EXAMPLE 11

1-methyl-2-(4'-aminophenyl)-5-nitroimidazole 37.3 gm. of 2-(4'-acetylaminophenyl)-4-nitroimidazole is heated for 15 minutes with 18.1 ml. methyl sulfate. After cooling, the reaction mixture is treated with concentrated ammonia solution and the insoluble material is filtered off. The precipitate is then extracted with methanol. The methanol solution is evaporated to dryness and the residue extracted with acetone. The acetone solution is filtered through a 600 gm. column of alumina using additional acetone to wash the column. Evaporation of the eluate to dryness leaves a residue of 1-methyl-2-(4'-acetylaminophenyl)-5-nitroimidazole; M.P. 246–247° C.

8.3 gm. of 1-methyl-2-(4'-acetylaminophenyl)-5-nitroimidazole is hydrolyzed at 100° C. with 6 N hydrochloric acid. The cooled hydrolyzate is neutralized with sodium hydroxide and the resulting precipitate is recrystallized from acetone to give 1-methyl-2-(4'-aminophenyl)-5-nitroimidazole melting at 205–215° C. Final purification is effected by alumina chromatography using benzene to introduce the material in the column and ether-chloroform (1:1) to elute the product. The analytical sample melts at 222–223° C.

EXAMPLE 12

2-(2'-aminophenyl)-4-nitroimidazole

A 50 mg. sample of 2-(2'-acetylaminophenyl)-4-nitroimidazole is heated on the steam cone in 2 ml. of 5 N hydrochloric acid for two hours. After a period of time, precipitate begins to form. Upon cooling additional precipitate forms and centrifugation and decantation give 2-(2'-aminophenyl)-4-nitroimidazole; M.P. 230–233° C.

EXAMPLE 13

N',N'-dimethyl-2-(4'-sulfonamidophenyl)-4-nitroimidazole 15 gm. of 2-phenyl imidazole is treated with 50 ml. of chlorosulfonic acid on a steam cone overnight. The excess chlorosulfonic acid is evaporated in vacuo. The residue is then cooled and added dropwise to a cooled solution of aqueous dimethylamine with stirring. The solid product, N',N'-dimethyl-2-(4'-sulfonamidophenyl) imidazole, is filtered off, washed with water and recrystallized from chloroform-petroleum ether; M.P. 180–185° C. Recrystallization from chloroform-petroleum ether gives a product with a melting point of 187–188° C.

7.2 gm. of the imidazole product is dissolved in 50 ml. of acetic anhydride containing 1.5 ml. of concentrated nitric acid. The reaction mixture is warmed on the steam cone and evaporated in vacuo to remove the acetic anhydride. The resulting mixture is made alkaline, treated with charcoal, recrystallized and filtered. Recrystallization from 1,2-dimethoxy ethane gives N',N'-dimethyl-2-(4'-sulfonamidophenyl)-4-nitroimidazole; M.P. 236–238° C.

When acetic acid is used in place of acetic anhydride in the above nitration process, N',N'-dimethyl-2-(4'-sulfonamidophenyl)-4-nitroimidazole again results.

EXAMPLE 14

1,N',N'-trimethyl-2-(4'-sulfonamidophenyl)-5-nitroimidazole 3 gm. of N',N'-dimethyl - 2-(4'-sulfonamidophenyl)-4-nitroimidazole is treated in 1,2-dimethoxy ethane with small portions of ethereal diazomethane and the reaction mixture is evaporated to dryness. The residue is dissolved in 1,2-dimethoxy ethane and the solution is again evaporated to dryness. Recrystallization from 1,2 - dimethoxy ethane gives 1,N',N'-dimethyl-2-(4'-sulfonamidophenyl)-5-nitroimidazole; M.P. 203–205° C.

EXAMPLE 15

2-(4'-carboxamidophenyl)-4-nitroimidazole 15 gm. of p-cyanobenzoic acid is refluxed with 100 ml. of thionyl chloride and 100 ml. of phenol for three hours. The solvents are removed in vacuo and the resulting acid chloride is added to aqueous ammonium hydroxide with stirring. The product, p-cyanobenzamide, has a melting point of 223–224° C.

The p-cyanobenzamide is dissolved in 2950 ml. of ethanol and this solution is saturated with hydrogen chloride. The reaction mixture is allowed to stand at room temperature for five days and ethyl p-carboxamido benzimidate hydrochloride is recovered.

The imino ether formed above is suspended in 500 ml. of methyl alcohol and added to 6.5 gm. of amino acetaldehyde diethyl acetal in 50 ml. of methanol. The reaction mixture is allowed to stand at room temperature for 24 hours and is then evaporated to a small volume, diluted with ether and cooled. The resulting solids are filtered off, washed with ether and added in small portions to 10.6 ml. of cold concentrated sulfuric acid with stirring. This reaction mixture is poured over ice in dilute sodium hydroxide and filtered giving 2-(4'-carboxamidophenyl) imidazole; M.P. 310–315° C.

To 25 ml. of ice cold 30% fuming sulfuric acid is added with stirring 2.6 gm. of 2-(4'-carboxamidophenyl)-imidazole. Fuming nitric acid is added and the reaction mixture is heated on a steam cone for 10 minutes, poured over ice, filtered and washed with water and acetone successively giving 2 - (4'-carboxamidophenyl)-4-nitroimidazole; M.P. 323–326° C.

When N',N'-dimethyl - 2-(4'-carboxamidophenyl) imidazole of N'-methyl-2-(4'-carboxamidophenyl) imidazole is used in the above process in place of 2-(4'-carboxamidophenyl) imidazole, there is obtained N',N'-dimethyl-2(4'-carboxamidophenyl)-4-nitroimidazole or N'-methyl-2-(4'-carboxamidophenyl)-4-nitroimidazole, respectively.

EXAMPLE 16

1-methyl-2-(4'-carboxamidophenyl)-5-nitroimidazole 500 mg. of 2-(4'-carboxamidophenyl)-4-nitroimidazole is dissolved in 200 ml. of hot 1,2-dimethoxy ethane. The resulting mixture is filtered, cooled in an ice bath and treated with 36 ml. of an excess of ethereal diazomethane. The resulting mixture is allowed to stand for two hours in the ice bath and is then evaporated to a small volume. The mixture is then filtered and the solid product, 1-methyl - 2 - (4'-carboxamidophenyl)-5-nitroimidazole, is washed with ether and recrystallized from acetone-ether; M.P. 233–235° C.

When the above process is carried out using N'-methyl-2 - (4'-carboxamidophenyl)-4-nitroimidazole or N',N'-dimethyl-2-(4'-carboxamidophenyl) imidazole, there is obtained 1,N' - dimethyl-2-(4'-carboxamidophenyl)-5-nitroimidazole or 1,N'N'-trimethyl-2-(4'-carboxamidophenyl)-5-nitroimidazole.

EXAMPLE 17

1-methyl-2-(4'-cyanophenyl)-5-nitroimidazole 232 mg. of 2-(4'-carboxamidophenyl)-4-nitroimidazole is dehydrated in vacuo at 251–258° C. for about 6 hours. The sublimate received as a result upon recrystallization from acetone-ether is 2 - (4'-cyanophenyl)-4-nitroimidazole, which upon recrystallization from acetone-ether has a melting point of 324–329° C. Additional recrystallization from ethanol gives a product melting at 333–334° C.

The above nitroimidazole is converted to 1-methyl-2-(4'-cyanophenyl)-5-nitroimidazole when the procedure of Example 23 is followed using 2-(4'-cyanophenyl)-4-nitroimidazole in place of 2-(4'-carboxamidophenyl)-4-nitroimidazole.

EXAMPLE 18

1-methyl-2-(2',4'-dinitrophenyl)-5-nitroimidazole 2,4-dinitrobenzaldehyde (30.8 gm.) is dissolved in 300 cc. of absolute ethanol. Upon addition of 75 cc. of 30% glyoxal solution and 75 cc. of concentrated ammonium hydroxide solution, the temperature slowly rises to 64° C. After 4 hours the reaction mixture is diluted with chloroform. The organic layer is separated, washed with water, dried over magnesium sulfate and concentrated to a dark oily residue. The residue is then extracted with boiling benzene. The benzene extracts are then passed over a column of 120 gm. of alumina. Elution is continued until by-product is passed through the column. The desired product, 2-(2',4'-dinitrophenyl) imidazole is obtained by eluting the alumina column further with acetone. After recrystallization from acetone-petroleum ether, the product displays a melting point of 237–239° C.

2.16 gm. of 2-(2',4'-dinitrophenyl) imidazole is dissolved in a mixture of 3 cc. of concentrated nitric acid and 3 cc. fuming sulfuric acid with cooling. The mixture is heated on the steam bath for 30 minutes, cooled and diluted with water. The resulting aqueous solution is extracted with ethyl acetate and the extracts are washed with water and concentrated to a residue. The residue is recrystallized from ethyl acetate to give 2-(2',4'-dinitrophenyl)-4-nitroimidazole; M.P. 215–223° C.

When the process of Example 6 is employed using 2-(2',4'-dinitrophenyl)-4-nitroimidazole in place of 2-(3',5'-dinitrophenyl)-4-nitroimidazole, the former is converted to 1-methyl-2-(2',4'-dinitrophenyl)-5-nitroimidazole.

EXAMPLE 19

1-methyl-2-(3'-nitro-4'-chlorophenyl)-5-nitroimidazole 5.4 cm. of 2-(3'-nitro-4'-chlorophenyl)-4-nitroimidazole is heated at 140–144° C. for two hours in the presence of 2 ml. of dimethyl sulfate. The reaction mixture is made alkaline with dilute sodium hydroxide and is then extracted with three 600 ml. portions of chloroform and the combined chloroform extracts are backwashed with two 100 ml. portions of 0.1 N sodium hydroxide and two 150 ml. portions of water. The chloroform solution is dried over sodium sulfate and is filtered and the filtrate is evaporated to dryness giving 1-methyl-2-(3'-nitro-4'-chlorophenyl)-5-nitroimidazole; M.P. 104–107° C.

When the above process is carried out using 2-(4'-trifluoromethylphenyl)-4-nitroimidazole in place of 2-(3'-nitro-4'-chlorophenyl)-4-nitroimidazole, there is obtained 1-methyl-2-(4'-trifluoromethylphenyl)-5-nitroimidazole.

EXAMPLE 20

1-methyl-2-(4'-biphenylyl)-5-nitroimidazole

A mixture of .41 gm. (1.55 mmol) of 2-(4'-biphenylyl)-4-nitroimidazole and .15 ml. (196 mg., 1.55 mmol) of methyl sulfate is heated 5 minutes at 150–160° C. The resulting viscous oil is cooled and extracted with a mixture of chloroform and excess dilute sodium hydroxide solution. The reaction product dissolves leaving an orange suspension of orange sodium salt of unreacted starting material in the aqueous phase. The aqueous phase is re-extracted with chloroform and the combined organic phases are dried and evaporated in vacuo to give a crystalline solid. This is filtered through 3.0 gm. of alkaline aluminum oxide in 1:2 dichloromethane ether solvent to give a pale yellow purified product. Recrystallization from alcohol gives a product melting at 206–211° C. Sublimation at 190–200° C. and 1 mm. pressure gives 1 - methyl-2-(4'-biphenylyl)-5-nitroimidazole melting at 208–210° C.

When in the above process in place of methyl sulfate there is used methyl toluene sulfonate or β-chloroethyl toluene sulfonate, there will result 1-methyl-2-(4'-biphenylyl) - 5 - nitroimidazole or 1-β-chloroethyl-2-(4'-biphenylyl)-5-nitroimidazole, respectively.

EXAMPLE 21

1-methyl-2-(3'-nitro-4'-methylphenyl)-5-nitroimidazole 1.15 gm. of 2-(3'-nitro-4'-methylphenyl)-4-nitroimidazole is heated for 35 minutes at 140° C. with 498 mg. of methyl sulfate. After cooling the mixture is dissolved by shaking with mixed chloroform and excess dilute sodium hydroxide. The chloroform phase is then evaporated to dryness. The crude crystalline residue is filtered through a 5.0 gm. column of basic alumina using 3:7 (v./v.) methylene chloride-ether as eluent. The residue from evaporation of the eluate is recrystallized from benzene-hexane to give 1-methyl-2-(3'-nitro-4'-methylphenyl)-5-nitroimidazole melting at 95–97° C.

When 2-(4'-formylphenyl) - 4 - nitroimidazole, 2-(4'-acetylphenyl)-4-nitroimidazole or 2-(2'-methylsulfonylphenyl)-4-nitroimidazole is used in place of 2-(3'-nitro-4'-methylphenyl)-4-nitroimidazole in the above process, there is obtained.
1-methyl-2-(4'-formylphenyl)-5-nitroimidazole,
1-methyl-2-(4'-acetylphenyl)-5-nitroimidazole or
1-methyl-2-(2'-methylsulfonylphenyl)-5-nitroimidazole, respectively.

EXAMPLE 22

1-methyl-2-(4'-hydroxyphenyl)-5-nitroimidazole 5.00 gm. of 1-methyl-2-(4'-aminophenyl)-5-nitroimidazole in 50 ml. 10% sulfuric acid is treated with 1.725 gm. sodium nitrite in a minimal volume of water while cooled in an ice bath. The solution is then warmed on the steam bath for an hour, cooled and carefully neutralized with 2.5 N sodium hydroxide. The resulting precipitate, 1-methyl-2(4'-hydroxyphenyl)-5-nitroimidazole, is filtered off, washed with water and air dried; M.P. 221–224° C.

EXAMPLE 23

1-methyl-2-(4'-methoxyphenyl)-5-nitroimidazole 507 mg. of 1-methyl-2-(4'-hydroxyphenyl)-5-nitroimidazole in 50 ml. of methanol is treated with a large excess of ethereal diazomethane while maintained at about 0° C. After standing in the cold overnight a few drops of acetic acid are added to destroy excess diazomethane. The solvents are removed in vacuo. Water is added to the residue and sufficient .1 N sodium hydroxide is added to make the mixture basic. The insoluble precipitate of 1-methyl-2-(4'-methoxyphenyl)-5-nitroimidazole is filtered off, washed with water and air dried. It displays a melting point of 109–110° C. after being filtered through acid-washed alumina using 1:1 ether-petroleum ether as eluent and recrystallized from ether.

When the above process is carried out using 1-methyl-2-(4'-mercaptophenyl) - 5 - nitroimidazole in place of 1-methyl-2-(4'-hydroxyphenyl)-5-nitroimidazole, there is obtained 1-methyl - 2 - (4' - methylthiophenyl)-5-nitroimidazole.

EXAMPLE 24

2-(2'-acetylaminophenyl)-4-nitroimidazole 200 mg. of 2-(2'-nitrophenyl)-4-nitroimidazole is dissolved in 1 ml. of ammonium hydroxide and 2 ml. of ethanol. Hydrogen sulfide is bubbled into the solution with stirring for about three hours. Every hour 1 ml. of ammonium hydroxide is added. After three hours, the solution is warmed to 85° C. on the steam cone and is then evaporated in vacuo to dryness. The contents of the flask are washed with a stream of nitrogen. There is then added 20 ml. of a mixture of acetic anhydride acetic acid and the mixture is heated on the steam cone for 45 minutes. After heating, the reaction mixture is cooled and the resulting solids are filtered. The filtrate is evaporated to dryness in vacuo on a steam bath. The remaining salts are dissolved in sodium hydroxide and the resulting mixture is filtered. The basic solution is extracted with three 100 ml. portions of chloroform. The aqueous alkaline solution is then acidified with glacial acetic acid and extracted with five 100 ml. portions of ethyl acetate. The ethyl acetate extracts are backwashed three times with water and evaporated to dryness in vacuo. The product is crude 2-(2'-acetylaminophenyl)-4-nitroimidazole. Recrystallization from acetone ether affords pure product; M.P. 284–285° C.

EXAMPLE 25

1-methyl-2-(2'-acetylaminophenyl)-5-nitroimidazole 2 gm. of 2-(2'-acetylaminophenyl)-4-nitroimidazole is treated with .81 ml. of dimethyl sulfate at 150° C. After cooling, dilute aqueous sodium hydroxide and chloroform are added to the reaction mixture. The chloroform phase is then evaporated to dryness giving 1-methyl-2-(2'-acetylaminophenyl)-5-nitroimidazole; melting point after recrystallization from acetone-ether, 233–235° C.

EXAMPLE 26

1-methyl-2-(4'-fluorophenyl)-4-nitroimidazole 1.2 gm. of 2-(4'-fluorophenyl)-4-nitromidazole is dissolved in 50 ml. of dry 1,2-dimethoxy ethane. 0.180 gm. of 52% sodium hydride is washed with ether to remove the mineral oil and then is added in small portions to the solution. 0.630 ml. (30% excess) of dimethylsulfate is introduced and the solution is refluxed for 3 hours. The solution is then cooled and evaporated in vacuo to about 10 ml. The residue is diluted with 50 ml. cold water and the resulting suspension is extracted with three 150 ml. portions of chloroform. The chloroform extracts are washed with a small amount of water and dried over sodium sulfate. After filtering off the drying agent, the chloroform is evaporated in vacuo and the crystalline residue is recrystallized from chloroform. A second recrystallization from chloroform affords 1-methyl-2-(4'-fluorophenyl)-4-nitroimidazole; M.P. 187–188° C.

When the above process is used and 2-phenyl-4-nitroimidazole,
2-(4'-nitrophenyl)-4-nitroimidazole,
2-(2'nitrophenyl)-4-nitroimidazole,
2-(2'-chlorophenyl)-4-nitroimidazole,
2-(3'-nitrophenyl)-4-nitroimidazole,
2-(4'-carboxamidophenyl)-4-nitroimidazole or
N',N'-dimethyl-2-(3'-sulfonamidophenyl)-4-nitroimidazole is used in place of 2-(4'-fluorophenyl)-4-nitroimidazole, there will result
1-methyl-2-phenyl-4-nitroimidazole,
1-methyl-2-(4'-nitrophenyl)-4-nitroimidazole,
1-methyl-2-(2'-nitrophenyl)-4-nitroimidazole,
1-methyl-2-(2'-chlorophenyl)-4-nitroimidazole,
1-methyl-2-(3'-nitrophenyl)-4-nitroimidazole,
1-methyl-2-(4'-carboxamidophenyl)-4-nitroimidazole or
1,N',N'-trimethyl-2-(3'-sulfonamidophenyl)-4-nitroimidazole,
respectively.

EXAMPLE 27

1-methyl-2-(3'-nitrophenyl)-5-nitroimidazole

A 3.0 gm. (14.08 mmol) sample of 1-methyl-2-phenyl-5-nitroimidazole is added in one portion to a cold solution composed of 10 ml. concentrated sulfuric acid and 0.66 ml. of concentrated nitric acid. The reaction mixture is warmed on the steam cone for about 30 minutes. After the reaction is complete the reaction mixture is cooled in an ice bath and poured over 250 ml. cracked ice. The resulting acidic solution is then made alkaline with 11.6 N NaOH. The product, 1-methyl-2-(3'nitrophenyl)-5-nitroimidazole, is filtered off and washed with water. Recrystallization from ether-acetone yields 1-methyl-2-(3'-nitrophenyl)-5-nitroimidazole; M.P. 125–126° C.

EXAMPLE 28

1-methyl-2-(3'-sulfonamidophenyl)-5-nitroimidazole

A 3.0 gm. (10.6 mmol) sample of 1-methyl-2-phenyl-5-nitroimidazole is added in small portions to 25 ml. of chlorosulfonic acid. The reaction mixture is then heated on the steam cone for 70 hours.

The excess chlorosulfonic acid is removed by distillation at reduced pressure. The remaining oil, contaminated with chlorosulfonic acid, is added dropwise with stirring to a slurry of ammonium hydroxide and ice. The resulting solution is extracted with ethyl acetate. The ethyl acetate extracts are dried and evaporated to dryness. The crystalline material is recrystallized from acetone ether to give 1-methyl-2-(3'-sulfonamidophenyl)-5-nitroimidazole; M.P. 205–206° C.

EXAMPLE 29

1-methyl-2-(4'-carboxyphenyl)-5-nitroimidazole 2.0 gm. of 1-methyl-2-p-tolyl-5-nitroimidazole is dissolved in a solution of 25% sulfuric acid. 3.5 gm. of sodium dichromate dihydrate dissolved in 20 ml. water is added. The resulting suspension is stirred rapidly during the gradual addition of 50 ml. concentrated sulfuric acid. The reaction solution is then heated for four hours at 75–85° C. The reaction mixture is filtered hot and the filtrate cooled in an ice bath. The pH of the filtrate is adjusted to pH 5 with 11.7 N sodium hydroxide. The crude 1-methyl-2-(4'-carboxyphenyl)-5-nitroimidazole resulting is removed by filtration. The product is then washed well with water and extracted thoroughly with about an equal volume of aqueous sodium bicarbonate. Filtration of this extract affords 300 mg. recovered starting material. Acidification to pH 6 and filtration of the filtrate affords substantially pure 1-methyl-2-(4'-carboxyphenyl)-5-nitroimidazole; M.P. 255–260° C.

When 1-methyl-2-(4'-carboxyphenyl)-5-nitroimidazole is treated with diborane in accordance with the method for reducing the carboxyphenyl nitroimidazole described in example 40, there is obtained 1-methyl-2-(4'-hydroxymethylphenyl)-5-nitroimidazole.

When 1-methyl-2-(4'-carboxyphenyl)-5-nitroimidazole is treated with diazomethane in accordance with the procedure of example 12, there is obtained 1-methyl-2-(4'-carbomethoxyphenyl)-5-nitroimidazole.

EXAMPLE 30

1-methyl-2-(4'-carboxamidophenyl)-5-nitroimidazole 2.2 gm. of 1-methyl-2-(4'-carboxyphenyl)-5-nitroimidazole is slowly added to 25 ml. thionyl chloride. The reaction mixture is refluxed for ½ hour. The thionyl chloride is evaporated in vacuo, and the flask is purged with benzene. The flask of crystalline material is chilled in a Dry Ice bath and 100 ml. methanol saturated with ammonia is added. The reaction mixture is stirred, warmed to 40° C. and retained at that temperature for 30 minutes. The solvent is then evaporated in vacuo. The residue is dissolved in refluxing 1,2-dimethoxyethane and the mixture filtered to remove ammonium chloride. The solvent is evaporated and the solution is allowed to crystallize. Recrystallization from isopropanol affords substantially pure 1-methyl-2-(4' - carboxamidophenyl)-5-nitrimidazole; M.P. 232–235° C.

When hydrazine is used in place of ammonia in the above process, there is obtained 1-methyl-2-(4'-carboxhydrazidophenyl)-5-nitroimidazole.

EXAMPLE 31

1-(2'-hydroxyethyl)-2-(4'-fluorophenyl)-5-nitroimidazole 4.00 gm. (19.3 mmol) of 2-(4'-fluorophenyl)-4-nitroimidazole and 4.7 ml. β-ethoxyethyl tosylate are heated together in a 170–175° C. oil bath for 1 hour with occasional stirring until the mixture becomes homogeneous. The mixture is is cooled to near room temperature and dissolved by agitating with a mixture of about 50 ml. of chloroform and 50 ml. of 4 N ammonium hydroxide. The chloroform phase is extracted twice with 2 N ammonium hydroxide and dried over sodium sulfate. Evaporation to dryness in vacuo gives a black syrup which is filtered through 30 gm. of basic alumina in 1,2-dichloromethane: ether. The very pale yellow band which comes through the column fairly rapidly is collected and evaporated in vacuo to give a yellow oil which crystallizes on seeding. The crude product is recrystallized from ether-hexane giving pale brown crystals of 1-(2'-ethoxyethyl)-2-(4'-fluorophenyl)-5-nitroimidazole.

57 mg. (.20 mmol) of the above product is heated at 100° C. in .3 ml. concentrated sulfuric acid for ½ hour. The mixture is diluted with 1.5 ml. water and heated an additional hour. The solution is treated with charcoal, diluted with 1 ml. water and treated dropwise with .7 ml. of 11.7 N sodium hydroxide while cooled in ice. The crystalline precipitate which forms is filtered off, washed with water and air dried. This material is recrystallized from benzene and then with charcoal treatment from methanol-water giving 1-(2'-hydroxyethyl)-2-(4'-fluorophenyl)-5-nitroimidazole; M.P. 165–167° C.

The tosylate ester is prepared by adding 36.0 gm. (.40 mol) of β-ethoxyethanol to a solution of 76.2 gm. tosyl chloride (.40 mol) in 150 ml. pyridine. The mixture is cooled at intervals in an ice bath to keep the temperature below 30° C. After about 2 hours at room temperature the mixture is poured into excess dilute 1 N hydrochloric acid and the product is extracted with ether. After drying over sodium sulfate, the ether is removed in vacuo to leave the product which is used without further purification.

When di(ethoxyethyl)sulfate or methoxydiazoethane is used in place of the ethoxyethyl tosylate in the above process, 1 - (2'-hydroxyethyl-2-(4'-fluorophenyl)-5-nitroimidazole is again obtained.

When the above procedure is carried out and 5 ml. of 4 N sodium hydroxide is added to the nitroimidazole-tosylate reaction mixture before heating, 1-(2'-hydroxyethyl)-2-(4'-fluorophenyl)-4-nitroimidazole is obtained.

When the above process is carried out using 2-phenyl-4-nitroimidazole,
2-(4'-tolyl)-4-nitroimidazole,
2-(4'-carboxyphenyl)-4-nitroimidazole,
2-(2'-hydroxyphenyl)-4-nitroimidazole,
2-(4'-chlorophenyl)-4-nitroimidazole,
2-(4'-trifluoromethylphenyl)-4-nitroimidazole,
2-(4'-biphenylyl)-4-nitroimidazole,
2-(4'-acetamidophenyl)-4-nitroimidazole,
2-(2'-nitrophenyl)-4-nitroimidazole,
N',N'-dimethyl-2-(3'-sulfonamidophenyl)-4-nitroimidazole,
2-(2'-methoxyphenyl)-4-nitroimidazole,
2-(3'-methylthiophenyl)-4-nitroimidazole,
2-(4'-formylphenyl)-4-nitroimidazole,
2-(2'-acetylphenyl)-4-nitroimidazole,
N'-methyl-2-(2'-acetamidophenyl)-4-nitroimidazole,
N',N'-dimethyl-2-(4'-aminomethylphenyl)-4-nitroimidazole, 2-(3'-methylsulfonphenyl)-4-nitroimidazole or 2-(3'-hydroxymethylphenyl)-4-nitroimidazole in place of 2-(4'-fluorophenyl)-4-nitroimidazole, there is obtained 1-(2'-hydroxyethyl)-2-phenyl-5-nitroimidazole,
1-(2'-hydroxyethyl)-2-(4'-tolyl)-5-nitroimidazole,
1-(2'-hydroxyethyl)-2-(4'-carboxyphenyl)-5-nitroimidazole,
1-(2'-hydroxyethyl)-2-(2'-hydroxyphenyl)-5-nitroimidazole,
1-(2'-hydroxyethyl)-2-(4'-chlorophenyl)-5-nitroimidazole,
1-(2'-hydroxyethyl)-2-(4'-trifluoromethylphenyl)-5-nitroimidazole, 1-(2'-hydroxyethyl)-2-(4'-biphenylyl)-5-nitroimidazole,
1-(2'-hydroxyethyl)-2-(4'-aminophenyl)-5-nitroimidazole,
1-(2'-hydroxyethyl)-2-(2'-nitrophenyl)-5-nitroimidazole,
N',N'dimethyl-1-(2'-hydroxyethyl)-2-(3'-sulfonamidophenyl)-5-nitroimidazole,
1-(2'-hydroxyethyl)-2-(2'-methoxyphenyl)-5-nitroimidazole,
1-(2'-hydroxyethyl)-2-(3'-methylthiophenyl-5-nitroimidazole,
1-(2'-hydroxyethyl)-2-(4'-formylphenyl)-5-nitroimidazole,
1-(2'-hydroxyethyl)-2-(2'-acetylphenyl)-5-nitroimidazole,
N'-methyl-1-(2'-hydroxyethyl)-2-(2'-aminophenyl-5-nitroimidazole,
N',N'-dimethyl-1-(2'-hydroxyethyl)-2-(4'-aminomethylphenyl)-5-nitroimidazole,
1-(2'-hydroxyethyl)-2-(3'-methylsulfonylphenyl)-5-nitroimidazole or
1-(2'-hydroxyethyl)-2-(3'-hydroxymethylphenyl)-5-nitroimidazole, respectively.

EXAMPLE 32

1-methyl-2-(4'-amidinophenyl)-5-nitroimidazole hydrochloride

A mixture of 2.74 gm. (10 mmol) of 1-methyl-2-(4'-ethoxyiminocarbonylphenyl) - 5 - nitroimidazole and .54 gm. (10 mmol) of ammonium chloride in 25 ml. of methanol is refluxed 6 hours, cooled, and the solvent removed in vacuo. The residue is crystallized from alcohol to give substantially pure 1-methyl-2-(4'-amidinophenyl)-5-nitroimidazole hydrochloride.

When the above process is carried out using methyl ammonium chloride, dimethyl ammonium chloride, piperidine hydrochloride, morpholine hydrochloride or pyrrolidine hydrochloride in place of ammonium chloride, there is obtained 1,N-dimethyl-2-(4'-amidinophenyl) - 5 - nitroimidazole hydrochloride, 1,N,N-trimethyl-2-(4'-amidinophenyl) - 5 - nitroimidazole, 1-methyl-2-(4'-N-piperidinoiminocarbonylphenyl)-5-nitroimidazole, 1 - methyl-2-(4'-N-morpholinoiminocarbonylphenyl) - 5 - nitroimidazole, or 1-methyl-2-(4'-N-pyrrolidinoiminocarbonyl) - 5 - nitroimidazole, respectively.

EXAMPLE 33

3-nitro-5,6-dihydroimidazo-[2,1:a]-isoquinoline 500 mg. (2.1 mmol) of 2-(2'-chloromethylphenyl)-4-nitroimidazole is refluxed for 2 hours in 5 ml. methanol with 103 mg. (2.1 mmol) sodium cyanide. The methanol is removed in vacuo and the residue of crude 2-(2'-cyanomethylphenyl)-4-nitroimidazole is refluxed 4 hours with 5 ml. 25% sulfuric acid. The acid solution in cooled and treated slowly with 2.5 N aqueous sodium hydroxide while stirring and cooling in ice until the pH is about 2. The precipitated crude product, 2 - (2' - carboxymethylphenyl)-4-nitroimidazole, is recrystallized from ethanol to give substantially pure material.

220 mg. 2-(2'-carboxymethylphenyl)-4-nitroimidazole is dissolved in 5 ml. 1,2-dimethoxyethane and treated with excess gaseous diborane over a period of 20 minutes. The diborane is generated by adding dropwise 7 ml. of 1 M sodium borohydride in 1,2-dimethoxy ethane to 2.3 ml. of boron trifluoride etherate in 5 ml. of 1,2 - dimethoxy ethane. The reaction mixture is allowed to stand at room temperature for 1 hour and is diluted carefully with 20 ml. water and 1 ml. 2.5 N hydrochloric acid. The mixture is extracted three times with 25 ml. portions of ethyl acetate and the combined extracts are then dried over sodium sulfate and evaporated to dryness in vacuo. The residual crude 2-[2'-(β-hydroxyethyl)-phenyl] - 4 - nitroimidazole is recrystallized from ethanol-ether.

150 mg. 2-[2'-(β-hydroxyethyl)-phenyl]-4-nitroimidazole (.64 mmol) is refluxed for 4 hours with 2 ml. of thionyl chloride. The excess thionyl chloride is removed in vacuo and the residue is treated with 5 ml. of water. The resulting mixture is extracted with 3 ml. of chloroform three times and the combined extracts are dried and evaporated in vacuo leaving a residue of crude 2-[2'-(β-chloroethyl)-phenyl]-4-nitroimidazole. This is purified by passage over 1.5 gm. of acid washed alumina using 1:1 ethyl acetate-ether as solvent. The solvent is removed in vacuo and the residue is heated at 200° C. for 20 minutes giving 3-nitro-5,6-dihydroimidazo[2,1:a] - isoquinoline.

It should be understood that although this invention has been described with reference to particular embodiments thereof, changes and modifications may be made which are within its intended scope and it should be limited only by the language of the appended claims.

We claim:
1. A process for preparing a compound of the formula

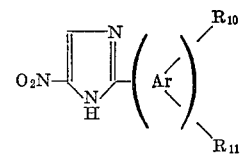

where Ar is phenyl; $R_{10}$ is selected from the group consisting of hydrogen, nitro and halo; and $R_{11}$ is selected from the group consisting of hydrogen, loweralkyl, phenyl, halo, nitro, diloweralkylsulfonamido, cyano, diloweralkylcarboxamido, formyl, loweralkanoyl, acylaminoloweralkyl, diloweralkylaminoloweralkyl, N'-morpholinoloweralkyl, N'-piperidinoloweralkyl, N'-pyrrolidinoloweralkyl, loweralkoxycarbonyl and loweralkylsulfonyl, which comprises treating a compound of the formula

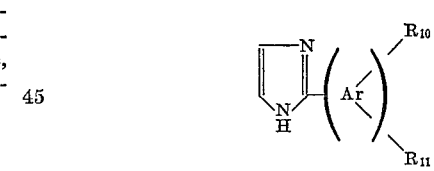

where Ar, $R_{10}$ and $R_{11}$ are defined above with a compound selected from the group consisting of nitronium tetrafluoroborate, nitronium hexafluorophosphate, nitronium hexafluoroarsenate, nitronium hexafluorosilicate, nitronium hexafluoroantimonate and nitronium perchlorate at a temperature of from about 0° to 20° C.

2. A process for preparing a compound of the formula

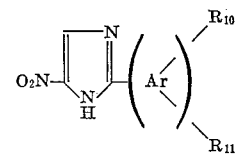

where Ar is phenyl, $R_{10}$ is selected from the group consisting of hydrogen, nitro and halo; and $R_{11}$ is selected from the group consisting of hydrogen, loweralkyl, phenyl, halo, nitro, diloweralkylsulfonamido, cyano, diloweralkylcarboxamido, formyl, loweralkanoyl, acylaminoloweralkyl, diloweralkylaminoloweralkyl, N'-morpholinoloweralkyl, N'-piperidinoloweralkyl, N'-pyrrolidinoloweralkyl, loweralkoxycarbonyl and loweralkylsulfonyl, which comprises treating a compound of the formula

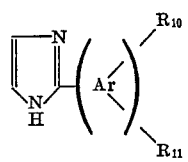

with nitronium tetrafluoroborate at a temperature of from about 0° to 20° C., where Ar, $R_{10}$ and $R_{11}$ are as defined above.

3. A process for attaching a nitro substituent to a carbon atom in the imidazole moiety of a compound having a phenyl group attached to the 2-position of an imidazole ring, which comprises treating said compound at a temperature of from about 0° to 20° C. with a member selected from the group consisting of nitronium tetrafluoroborate, nitronium hexafluorophosphate, nitronium hexafluoroarsenate, nitronium hexafluorosilicate, nitronium hexafluoroantimonate and nitronium perchlorate.

References Cited

UNITED STATES PATENTS 3,162,675   12/1964   Olah et al. ---------- 260—465

FOREIGN PATENTS

Olah et al.: J. Am. Chem. Society, vol. 84, pp. 3684–7, 1962.

ALEX MAZEL, Primary Examiner

JOSE TOVAR, Assistant Examiner

U.S. Cl. X.R.

260—247.5, 293; 424—248, 267, 269